United States Patent Office 2,824,016
Patented Feb. 18, 1958

2,824,016

FILM-FORMING COMPOSITION WITH A TEREPHTHALAMIDE ESTER PLASTICIZER AND AN ARTICLE COATED THEREWITH

Ralph T. K. Cornwell, Rosemont, Pa., assignor to American Viscose Corporation, Philadelphia, Pa., a corporation of Delaware No Drawing. Application July 29, 1955
Serial No. 525,348

3 Claims. (Cl. 106—180)

This invention relates to novel compositions of matter comprising a film-forming polymer, natural or synthetic, and a plasticizer consisting of the dipropionate of N,N'bis (beta-hydroxyethyl) terephthalamide. This application is a continuation-in-part of my copending application Serial No. 244,855, filed September 1, 1951, now abandoned, which in turn is a continuation-in-part of my application Serial No. 135,835, filed December 29, 1949, now abandoned, which in turn is a continuation-in-part of my copending application Serial No. 75,965, filed February 11, 1949, now abandoned.

The dipropionate of the present invention has the following formula:

and is a white crystalline solid useful not only as a plasticizer for high polymers but also as an intermediate in the production of synthetic resins and fibers.

It is made by the ammonolysis of diethyl terephthalate to N,N'bis (beta-hydroxyethyl) terephthalamide which is then reacted with propionic acid to produce the corresponding ester thereof. In the first step a mixture of diethyl terephthalate and monoethanolamine in ethyl alcohol may be heated until a clear solution of the reactants is obtained; this clear solution may be heated further until all of the alcohol has been removed, usually 4 to 6 hours, or it may be allowed to stand for about 12 hours at room temperature until the reaction product N,N'bis (beta-hydroxyethyl) terephthalamide crystallizes. This, when reacted with propionic acid, results in a crystalline product of the formula illustrated above.

The following example illustrates a method for the preparation of the dipropionate component of the present invention.

Example 222.23 parts of diethyl terephthalate (M. P. 43.5–44° C.) and 137.43 parts of monoethanolamine were placed in a vessel and ethyl alcohol was added to form a clear solution. The solution was refluxed on the steam bath for three hours, and the solution was then allowed to stand for about 12 hours, at which time the amide had crystallized. The crystals were filtered off and the filtrate was concentrated. Practically theoretical yields (97–98.5%) of the N,N'bis (beta-hydroxyethyl) terephthalamide were obtained.

The compound was completely stable when subjected to the action of 0.7 N alcoholic sodium hydroxide for two hours at reflux. It occurred in the form of prisms and needles having an extinction angle of approximately 45° when examined under crossed Nicol prisms.

Five g. (0.02 mole) N,N'bis (beta-hydroxyethyl) terephthalamide and 35 cc. (0.47 mole) pure propionic acid were refluxed in the presence of 0.20 cc. conc. sulfuric acid for three hours. Some remained which went into solution as 25 cc. of the propionic acid was removed by distillation. Crystallization occurred when the reaction mixture was cooled to 25° and the crystals were washed with two 20 cc. volumes of cold anhydrous ether. The crude product was taken up in absolute ethanol and after standing at 3° C. for two days crystallization occurred, but yields were poor because of the high solubility in alcohol. Upon subsequent recrystallizations and drying from ethanol and aqueous ethanol the melting point was sharp and constant at 172.5° C. The crystals were very fine needles and plates with an extinction angle approximately parallel. Analysis calcd. for $C_{18}H_{24}O_6N_2$: C, 59.33%; H, 6.63%; N, 7.69%. Found: C, 59.38%; H, 6.61%; N, 7.89%. The compound is soluble in ethanol, methanol, water, ether, acetone, lower aliphatic acids, 1,4-dioxane, ethyl acetate, chloroform, and methyl Cellosolve. It is insoluble in hydrocarbons, including aromatics such as toluene.

This compound, the dipropionate of N,N'bis (beta-hydroxyethyl) terephthalamide may be used as a plasticizer and coating agent for cellulosic films and sheet. For example, it may be employed as the plasticizer in moistureproofing and/or heat-sealing coatings for cellophane, such as those described in my Patents 2,487,105 and 2,487,106. Other film-forming materials which may be plasticized by the dipropionate of the present invention include (1) thermoplastic resins such as polyvinyl chloride, polyvinylidene chloride, polystyrene, copolymers of vinyl chloride and vinyl acetate, copolymers of methyl methacrylate and vinyl chloride, polyvinyl butyral, polyvinyl acetal, polymethyl methacrylate, polymethyl acrylate, polyethylene, polyamides, natural rubbers, synthetic rubbers; chlorinated rubber, polysulfides, poly-isobutylene, cyclized rubber, rubber hydrochloride, buna rubber, coumarone-indene with rubber, oil-modified and unmodified alkyd resins prepared from dihydroxy alcohols and dicarboxylic acids, phenol-formaldehyde resins prepared from phenols having only two reactive positions (2) thermoplastic cellulose compounds such as cellulose acetate, cellulose acetate butyrate, cellulose acetate propionate, cellulose propionate, benzyl cellulose, ethyl cellulose, butyl cellulose, hydroxyethyl cellulose, (3) such thermosetting resins as urea-formaldehyde, phenol-formaldehyde (phenols having three reactive positions), melamine-formaldehyde, alkyd resins prepared from polyhydric alcohols and polycarboxylic acids, phenol-furfural, unsaturated polyesters, polyallyl alcohol and derivatives, protein-formaldehyde resins such as casein-formaldehyde and shellac-formaldehyde and (4) mixtures of thermoplastic and thermosetting resins such as polyvinyl chloride and urea-formaldehyde-butanol ether, polyvinyl chloride and phenol-formaldehyde, polymethacrylate and urea-formaldehyde, polystyrene and alkyd, coumarone-indene and alkyd, polyvinyl acetal and melamine-formaldehyde. In such compositions, the film-forming material may be present in a proportion of 40 to 95% by weight of the total solids in the compositions, and the dipropionate of the present invention may be present in a proportion of 5 to 45% by weight of the total solids.

While it is an advantage of the present plasticizers that they possess solvent powers for so many plastic components that they can normally be used as the only plasticizer, the invention is by no means limited to plastic compositions in which it is the only plasticizer present. On the contrary, it may be associated with other plasticizers such, for example, as dibutyl phthalate, dilauryl phthalate, cyclohexyl butyl phthalate, di(methylcyclohexyl) phthalate, di(dimethylcyclohexyl) adipate, dicyclohexyl adipate, tricresyl phosphate, esters of o-benzoyl benzoic acid such as butyl benzoyl benzoate derivatives of toluene sulfonamide, or the like.

As moistureproofing agents, waxes or wax-like material such as paraffin, petrolatum, ceresin, japan wax, palm wax, beeswax, certain chlorinated hydrocarbons, Chinese insect wax, or other synthetic waxes or wax-like materials may be used. If some of these waxes are too soft for the purpose desired, they may be mixed with harder waxes of the group or with carnauba wax, candelilla wax or other harder waxes. Generally, paraffin serves as a satisfactory moistureproofing agent which may be hardened, if necessary, by admixture with carnauba wax or candelilla wax.

As the cellulose derivative, there may be used water soluble organic or solvent soluble cellulose ethers such as glycol, ethyl, or benzyl cellulose; cellulose esters such as cellulose nitrate, which is particularly useful; cellulose acetate, which is of limited compatibility; and such mixed esters or ether-esters as cellulose acetate-nitrate, cellulose acetate-propionate or ethyl cellulose-nitrate. These cellulose derivatives may be of various degrees of conversion as, for example, cellulose nitrates of various nitrogen contents.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, and soluble resins of the phenol-formaldehyde type. Non-resinous blending agents may be used when they yield homogeneous mixtures and these may include hydrogenated castor oil, castor oil phthalate, lanolin or wool grease, ethyl abietate, methyl abietate, diethylene glycol rosinate, diethylene glycol hydrorosinate, or the like.

It is the most convenient to apply the above lacquer and moistureproofing coating compositions to base materials, such as sheets of regenerated cellulose, by means of suitable solvents. Thus, the film-forming ingredients may be dissolved to give a coating solution of an appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent, moistureproof, coated base will be obtained.

These moistureproofing compositions may be applied to various sheet material to produce wrapping tissues which are flexible, moistureproof and heat-sealable and which exhibit highly improved surface characteristics including excellent surface slip and resistance to caking, sticking, or marring during storage. A variety of base sheet materials may be used, such as cellulosic materials, paper, albuminous materials (gelatin, agar-agar, casein), or films made from rubber derivatives, that is, rubber hydrochloride, chlorinated rubber, or the material prepared by reacting rubber and a metal halide such as boron trifluoride, stannous or stannic chloride, stannic acid, and other materials. In the preferred embodiment of the invention, a non-porous, non-fibrous, dense, smooth surfaced, and preferably transparent material such as regenerated cellulose, cellulose ester films including cellulose nitrate and cellulose acetate, or cellulose ether films including ethyl cellulose, benzyl cellulose, glycol cellulose, or lowly etherified cellulose such as those in which there is only one substituent group for several glucose units of cellulose, is employed.

The following examples illustrate typical compositions using the plasticizer of the present invention in (1) lacquers useful for coating films or (2) heat-sealing and moistureproofing compositions for application to cellophane, the parts given are by weight.

|  | 1 | 2 | 3 | 4 | 5 |
|---|---|---|---|---|---|
| Nitrocellulose (5-6 sec.) | 43 | 30 | 50 | 40 | 45 |
| Plasticizer [1] | 20 | 30 | 35 | 35 | 22 |
| Dibutyl phthalate | 10 | 5 |  |  | 7.5 |
| Paraffin, M. P. 67° C | 5 | 5 | 4 | 4.5 | 5 |
| Dammar Gum |  | 30 |  | .20 |  |
| Ester Gum | 20 |  | 10 |  | 20 |
| Blown Rapeseed oil |  |  | 1 | 0.5 | 0.5 |

[1] Dipropionate of N,N'bis (beta-hydroxyethyl) terephthalamide.

For purposes of easy application, the compositions may be dissolved in solvents employing about 10 parts of the above composition in about 250 parts of solvent. A solvent mixture containing 15 parts ethyl acetate, 15 parts butyl acetate and 70 parts toluene has been found satisfactory. The solution may then be applied as a coating and dried in the usual way or formed into sheets or films.

It is to be understood that changes and variations may be made without departing from the spirit and scope of the invention as defined in the appended claims.

I claim:

1. A new composition of matter comprising (1) an organic polymeric film-forming material selected from the group consisting of thermoplastic resins, thermoplastic cellulose esters and ethers, thermosetting resins, and mixtures of thermoplastic and thermosetting resins, and (2) as a plasticizer the dipropionate of N,N'bis (beta-hydroxyethyl) terephthalamide.

2. The composition of claim 1 wherein the plasticizer comprises 5 to 45% by weight of the total solids in the composition.

3. An article having a surface thereof coated with the composition of claim 2.

References Cited in the file of this patent
UNITED STATES PATENTS

| 2,487,106 | Cornwell | Nov. 8, 1949 |
| 2,552,321 | Jayne et al. | May 8, 1951 |